United States Patent [19]

Scheler

[11] 4,015,721
[45] Apr. 5, 1977

[54] PROGRAMMABLE DEVICE FOR MECHANICALLY EXECUTING WORK PROCESSES

[75] Inventor: Holger Scheler, Klausdorf, Schwentine, Germany

[73] Assignee: Hagenuk vormals Neufeldt & Kuhnke GmbH, Kiel, Germany

[22] Filed: Aug. 25, 1975

[21] Appl. No.: 607,431

[30] Foreign Application Priority Data

Sept. 6, 1974 Germany .......................... 2442865

[52] U.S. Cl. .......................... 214/1 BB; 214/147 T; 214/151; 214/655
[51] Int. Cl.² .......................................... B25J 9/00
[58] Field of Search ............ 214/1 BB, 1 BC, 1 BD, 214/1 BT, 1 BH, 1 BV, 147 T, 151, 655, 1 B

[56] References Cited
UNITED STATES PATENTS 3,212,649  10/1965  Johnson .......................... 214/1 BC
3,935,950  2/1976  Burch .......................... 214/1 BC X Primary Examiner—Robert J. Spar
Assistant Examiner—George F. Abraham
Attorney, Agent, or Firm—Prutzman, Hayes, Kalb & Chilton

[57] ABSTRACT

The present invention relates to a programmable device for mechanically executing work operations, more particularly, to a handling device consisting of a series of mutually coupled rotating and/or displacement elements, wherein the moving part situated at the one end is associated with a production unit while the moving part situated at the other end has a tool mounted thereon, for example, a gripper means for handling workpieces, paint spray guns for applying paint, welding rods for resistance welding, etc. The moving elements are designed to move various loads into predetermined positions at given speeds.

37 Claims, 15 Drawing Figures

U.S. Patent   April 5, 1977   Sheet 1 of 10   4,015,721
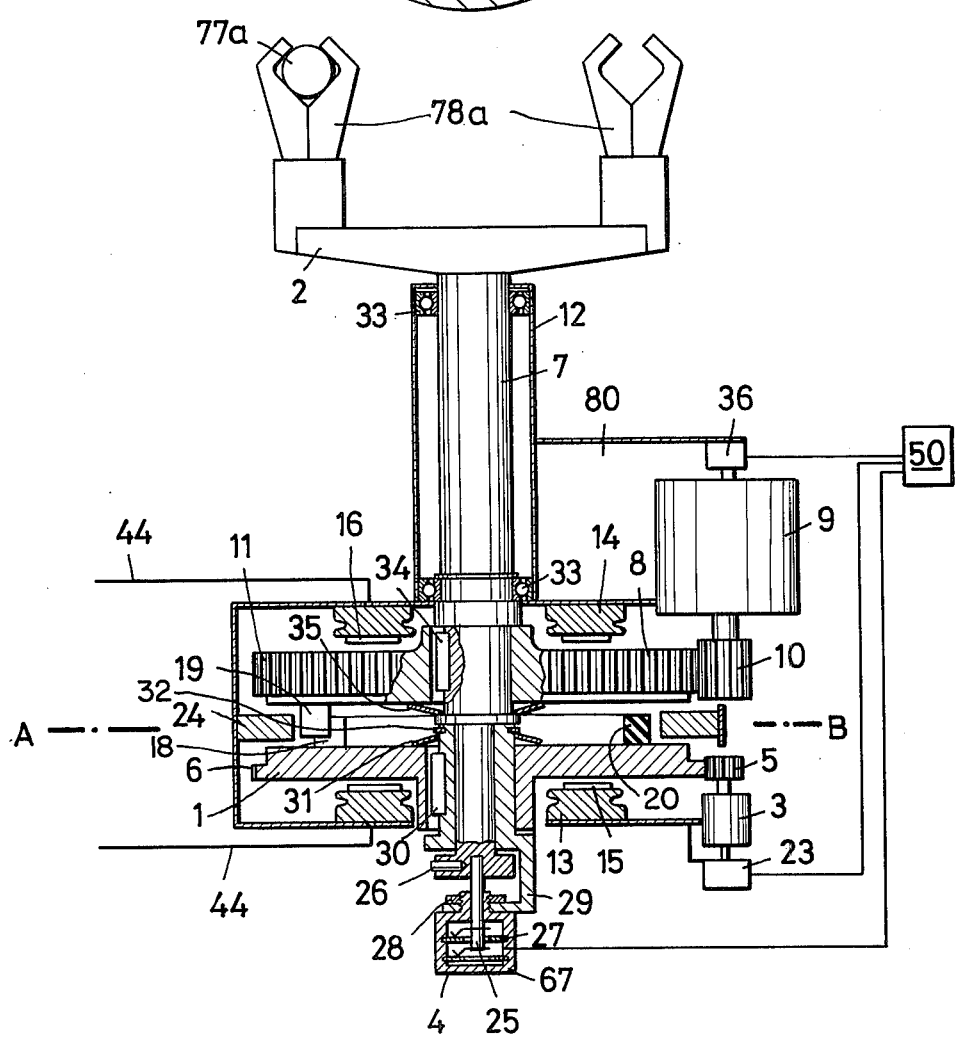

PROGRAMMABLE DEVICE FOR MECHANICALLY EXECUTING WORK PROCESSES

DESCRIPTION OF THE PRIOR ART

Widely applicable programmable devices of this type generally comprise three to seven moving elements which can occupy a number of intermediate positions, in addition to the end positions, for the purpose of successively moving the work tool into a preselectable position at a plurality of preselected spots in the work region.

In the course of an operating cycle, for example, when avoiding obstacles in the work region, when resistance welding a plurality of points in succesion or when picking up and systematically depositing workpieces on stationary pallets it is necessary to engage preselectable intermediate positions with, in part, a high degree of repeatable precision. In the course thereof it is generally necessary to have a high rate of travel, for example, when workpieces are being handled — to reduce the uneconomical delay when loading and unloading the processing machines or, when processing machines are linked together, to ensure that the work rhythm is maintained.

However, the device should not only be capable of engaging different intermediate positions but certain work processes such as dipping workpieces in baths or joining breakable parts also necessitate a plurality of preregulatable speeds.

The known programmable handling devices wherein the hydraulic drive means preferably employed for the moving parts is operated as a position control means in a closed regulating circuit are generally unable to attain a particularly high positioning rate for the intermediate positions because the viscosity of the pressure oil varies as a function of the temperature and marked load variations with the moving parts in a different position tend to produce inaccuracies which steadily increase through wear.

Adequate positioning accuracy is obtainable at low speeds and/or with small loads. However, in these cases there is generally no available economical application. Positioning accuracy can also be obtained with a construction comprising only a few moving elements. However, this prevents universal application of the device. It can also be obtained with a construction in which the intermediate positions are determined by adjustable fixed stops. These provide for accurate intermediate positions and can also be encountered at high speed but the number of intermediate positions corresponds to the number of fixed spots and is thus restricted both for technical reasons and reasons of cost. Accordingly, the use of this construction is limited to work cycles involving a small number of intermediate positions.

SUMMARY OF THE INVENTION

The object of the present invention is to produce a programmable handling device of the type described initially wherein any desired number of intermediate positions of the moving parts or work tool can be engaged with a high degree of precision and at a preselectable speed. The differing loads applied to the individual moving parts in the different positions of the device and wear caused by the loads should have no effect on the positioning accuracy.

According to the invention this object is achieved in that the rotating and displacement elements consist of auxiliary positioning gears which operate independently of the load and of load-dependent follow-up positioning gears. The programmable auxiliary positioning gear comprises stops for a positioning member; the stops being connectable in a force-locking manner with a stationary housing part and being adjustable with respect thereto. The positioning member is moved after the stops of the auxiliary positioning gear by the follow-up gear in synchronous speed therewith through the intermediary of a speed control means connected with the auxiliary positioning gear.

On reaching the predetermined nominal position, the stops are arrested and a special device ensures that the positioning member approaches the stop with decreasing speed and reaches it with its speed close to zero.

In contrast to that of the follow-up positioning gear, the load on the auxiliary positioning gear is very slight. Accordingly, the wear on this gear is also very slight. As the positioning accuracy is essentially determined by the auxiliary positioning gear it only varies slightly during operation of the device.

Accordingly, the theory on which the invention is based is that of dividing the moving parts into an auxiliary positioning gear and a follow-up gear; the auxiliary positioning gear controlling the positioning of the stops limiting the path of the follow-up gear which bears the load and which can therfore also be referred to as the load positioning gear. The speed pattern of the auxiliary positioning gear is determined by a programmable control means. The follow-up positioning gear follows the auxiliary positioning gear by way of a speed-path couple. The couple provides control of the speed of the follow-up positioning gear. This speed is dependent on the extent and direction of the particular distance between the stops of the auxiliary positioning gear and of the follow-up positioning gear. When the stops are adjacent to one another, the speed of the follow-up positioning gear is zero.

Other objects, features and advantages of the present invention will be made apparent from the following description, claims and drawings which represent various embodiments of the invention in diagrammatic form.

BRIEF DESCRIPTION OF THE DRAWINGS

FIG. 1 is a side view of a rotating element.
FIG. 2 is a section along the line A- B.

DESCRIPTION OF THE PREFERRED EMBODIMENTS

Figure 4:
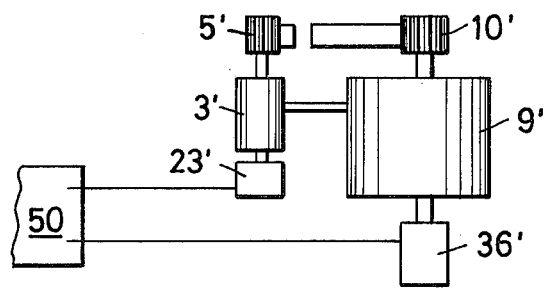
FIG. 4 is a section along the line C-D.

The auxiliary positioning gear of the rotating element shown in FIG. 1 consists of a stop plate 1 which is mounted for axial displacement and rotation through the intermediary of a hub 29 coaxially disposed on a shaft 7 of a positioning member 2, of a servo motor 3 and a speed control part 4. A gear wheel 5 on the drive shaft of the servomotor 3 engages without play in a denticulated portion 6 of the stop plate 1 which, in turn, transmits its rotary motion via an adjusting spring 30 to the control part 4 connected to the hub 29.

The follow-up positioning gear consist of the positioning member 2, the shaft 7 and a positioning plate 8 connected with the shaft in an axially displaceable manner via an adjusting spring 34 as well as a follow-up motor 9. A gear wheel 10 on the drive shaft of the fullow-up motor 9 engages in a denticulated portion 11 of the positioning plate 8.

The shaft 7 is rotatably mounted in the housing 12 by means of roller bearings 33. In this embodiment it bears a work tool consisting of double gripper means 78a holding a workpiece 77a.

Hydraulically operable brake cylinders 13 and 14 consist of an inner and an outer metal bellows and are connected to the housing 12 in a non-rotable and pressure-tight manner. The inner and outer metal bellows are also mutually connected on their front sides in a pressure-tight manner and are faced with friction linings 15 or 16. In the pressureless state there is an air gap between the friction lining 15 and the stop plate 1, resp., between the friction lining 16 and the positioning plate 8. A brake ring 24 against which the stop plate 1 can be pushed by the brake cylinder 13 during braking, resp., the positioning plate 8 by the braking cylinder 14, is coaxially disposed with respect to the shaft 7 and is rigidly connected to the housing 12. After braking, the stop plate 1 is reset by a cup spring 31 which is arranged with initial biasing between a retaining ring 32 disposed on the hub 29 and the stop plate 1. The resetting of the positioning plate 8 is likewise effected by a second cup spring 35 which is arranged with initial biasing between a flange on the shaft 7 and the positioning plate 8.

With a stop 20 which leaves a clearance gap, the stop plate 1 projects into the path of another stop 19 which is rigidly connected to the positioning plate 8. When the positioning member 2 is rotated in a clockwise direction (positive direction of rotation) the stop 19 contacts a contact surface 18 of the stop 20. When the positioning member 2 is rotated in the opposite direction (negative direction of rotation) the stop 19 touches another contact surface 17 of the stop 20.

The speed control part 4 is, on the one hand, connected by its housing containing two resistance paths 27 and 67 to the stop plate 1 through a threaded nut 28 via the hub 29 and, on the other hand, by its slide shaft 25 to the shaft 7 of the positioning plate 8 through a threaded pin 26. The speed of the follow-up motor 9 is controlled by regulating devices contained in a control block 50 as a function of the respective difference in the positions of the auxiliary and follow-up gears, the angle $a$ from the position of the stop 19 to the contact face 18 (see FIG. 2) in proportion to the resistance value of the active resistance path 27 or 67 for the corresponding direction of rotation. By virtue of a resistance or speed course corresponding to the diagram shown in FIG. 6 it is possible to ensure that, depending on the direction of rotation, the stop 19 approaches the contact surfaces 17 or 18 with decreasing speed. The course of the resistance over the angle can be planned for each direction independently by adopting a corresponding function and by varying the nature of the resistances 27 or 67 in a known manner, for example, by wiring up taps. It can thus be adapted for other conditions, for example, the influence of the force of gravity during raising and lowering operations.

Figure 10:
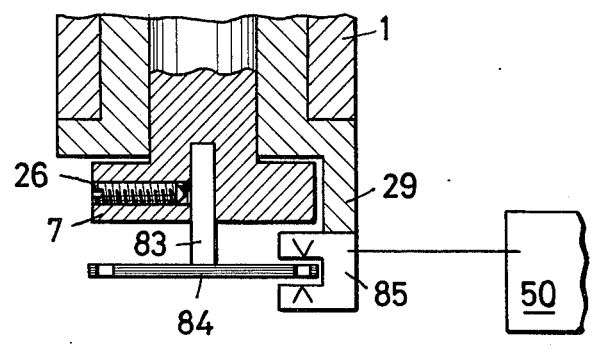
FIG. 10 shows another embodiment of the speed control means of the follow-up positioning gear in the form of an angle coder.

Apart from being designed as a rheostat in an electrical regulating circuit with or without amplification, the speed control part 4 can also be in the form of a digital pulse generator comprising in series therewith the respective control system for the follow-up motor 9- as shown in FIG. 10. In this embodiment a part of the pulse generator which is coaxially disposed with respect to the shaft 7 is in the form of a coding plate 84 of an angle coder and is fastened in a coaxial bore of the shaft 7 by means of the threaded pin 26. A feeling head 85 for the pulse generator is mounted on the hub 29 of the stop plate 1. The values determined for the angle variation and the direction of rotation are supplied to the control block 50 to control the follow-up motor 9. In the course thereof the pulse generator supplies the speed regulator (FIG. 8) with the nominal speed and a tachometer 36 the actual speed.

Figure 11:
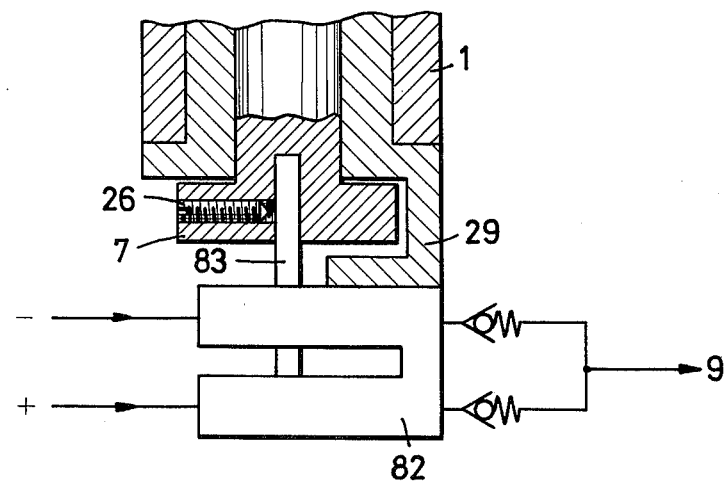
FIG. 11 shows another embodiment of the speed control means in the form of a quantity regulating valve.

If the follow-up motor 9 is to be hydraulically or pneumatically operated, the speed control part 4 will be in the form of pneumatic or hydraulic throttle or volume regulating valves. A valve will be provided for each direction of movement. Check valves in the line to the follow-up motor are provided to prevent mutual influencing. According to FIG. 11, a control shaft 83 which is connected to the shaft 7 by means of the threaded pin 26 controls the flow passage cross section, resp., the quantities of flow of the regulating valves as a function of the angle $a$. In a similar manner to the potentiometer resistances the cross-sectional areas of the throttle points are designed, in the manner of the course of the speed, as a function of the angle according to a preselected function (see FIG. 6).

Figure 8:
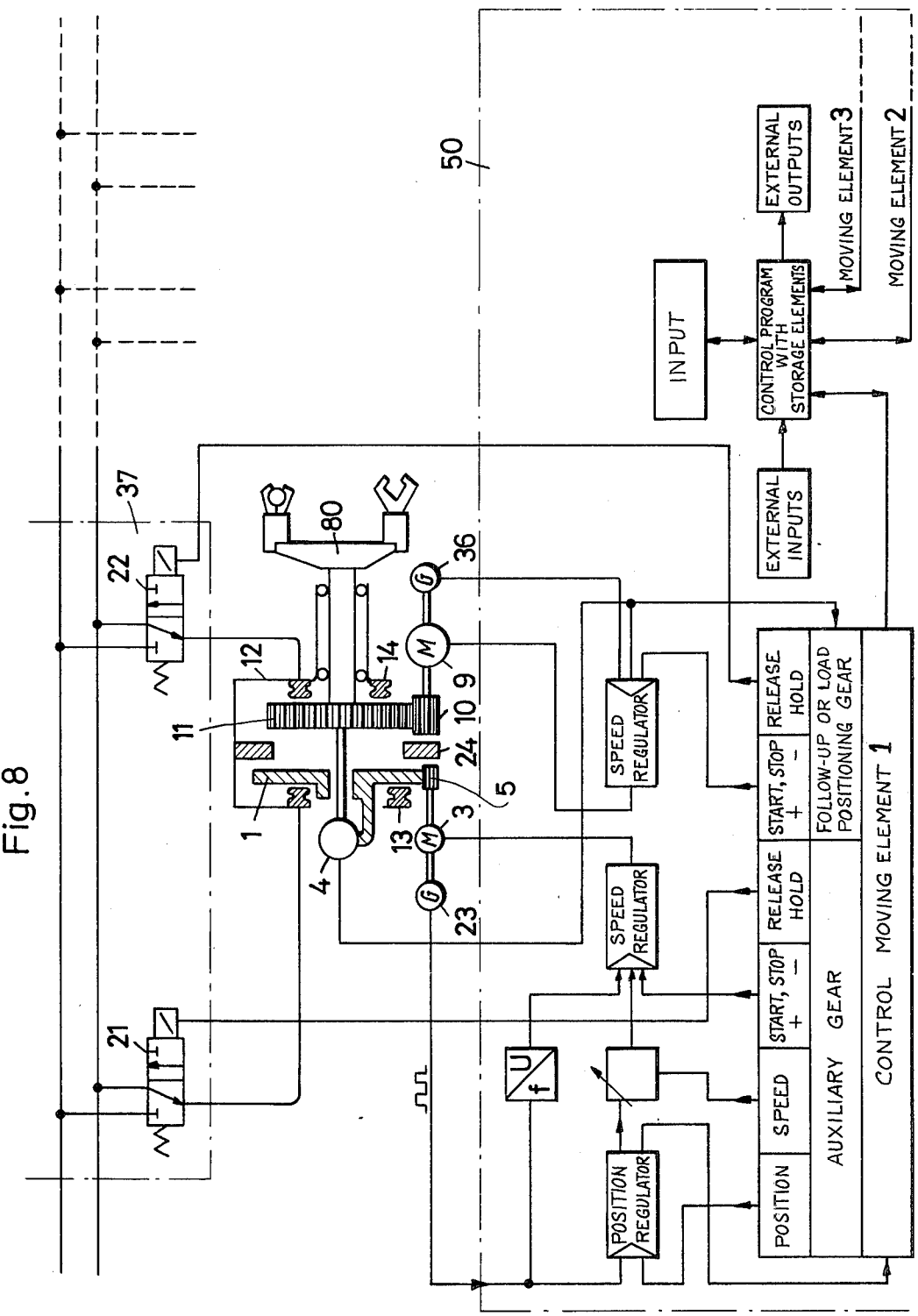
FIG. 8 is a block switching diagram for the operation of a moving element, showing the connection with other moving elements or master control devices.

The switching diagram according to FIG. 8 is the block diagram of the control block 50 of the device. The control processes are represented for a rotating element 80. The control part 1 for this moving element is linked via a master control program for the entire device with the control systems for the other moving elements; these control systems being connected in parallel. The master control program influences the control systems of the individual moving elements which are connected in parallel and receives answer signals. It also links the device to other production units, for example, other machines in a chain, by means of external inputs and outputs.

The control part for the moving element influences the position and speed regulating circuit for the servomotor 3 and the speed regulating circuit for the follow-up motor 9.

The nominal position, direction and degree of speed and start and stop parameters for the auxiliary positioning gear are preset by the program in the control block 50. Processing follows the program operation plan shown in FIG. 9. Influencing of the auxiliary positioning gear is effected via a transmitter 23 for the servomotor 3 and a control valve 21 for the brake 13.

In the case of the follow-up positioning gear, only the start and stop order is issued by the control block 50 while the controlling of its speed by the speed control part 4 which also links the auxiliary positioning gear and the follow-up positioning gear in terms of commands is directly subordinate to the follow-up positioning gear. Influencing of the follow-up gear is effected by a tachogenerator 36 which constitutes the transmitter for the follow-up motor 9 and by a control valve 22 for the brake 14.

FIG. 8 clearly showns the much more complicated regulating system for the auxiliary positioning gear which is operated at a lower power, resp., the less complicated regulating system for the follow-up positioning gear which is operated at a higher power.

According to FIG. 2 the positioning member 2 of the moving element is on the path angle $a$ from one intermediate position to the following one. The electrically operating servomotor 3 is switched on in the control block 50 by the control device and operates with programmable speed and time responses. The direction of rotation of the motor 3 is determined by the control device from the position and sequence of the intermediate positions. In this case the actual values for regulating the speed and position of the servomotor 3, resp., of the stop plate 1 are determined by a path increment sensor 23 in the form of a known increment or pulse generator. The position is determined by the control device from its pulse count and the speed from its pulse frequency. The servomotor 3 is then regulated according to the programmed speed - time responses. As it approaches the nominal position the speed of the servomotor 3 is reduced such that it comes to a standstill on reaching the nominal position.

When this nominal position is reached or when disturbances occur the control valve 21 is deenergized and is released by a spring with the result that the brake cylinder 13 is acted on by a medium exposed to excess pressure. The excess pressure produces axial expansion of the brake cylinder 13. In the course thereof the friction lining 15 is placed on the stop plate 1 and it presses the latter against the brake ring 24. The excess pressure should be selected in such a way that the associated brake torque is a multiple of the maximum torque exerted on the positioning member 2 by the motor 9.

Figure 7:
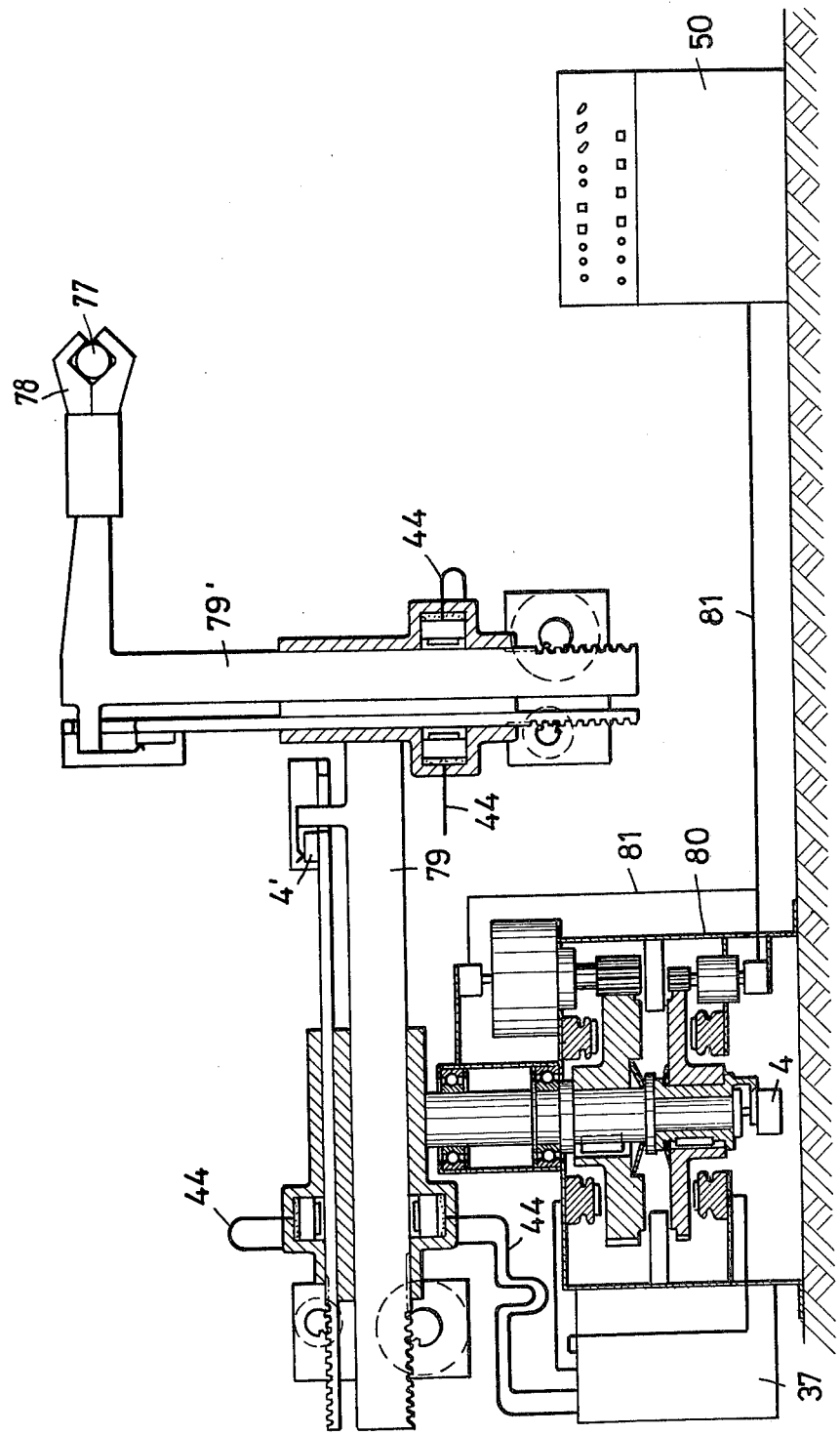
FIG. 7 shows a device according to the invention consisting of a rotating element and two displacement elements for covering the space defined by cylinder coordinates and comprising a control desk for oerating the device.

The excess pressure is produced in a hydraulic device which is preferably combined in a block 37 and attached to the base support of the rotating element 80, as shown in FIG. 7.

Figure 5:
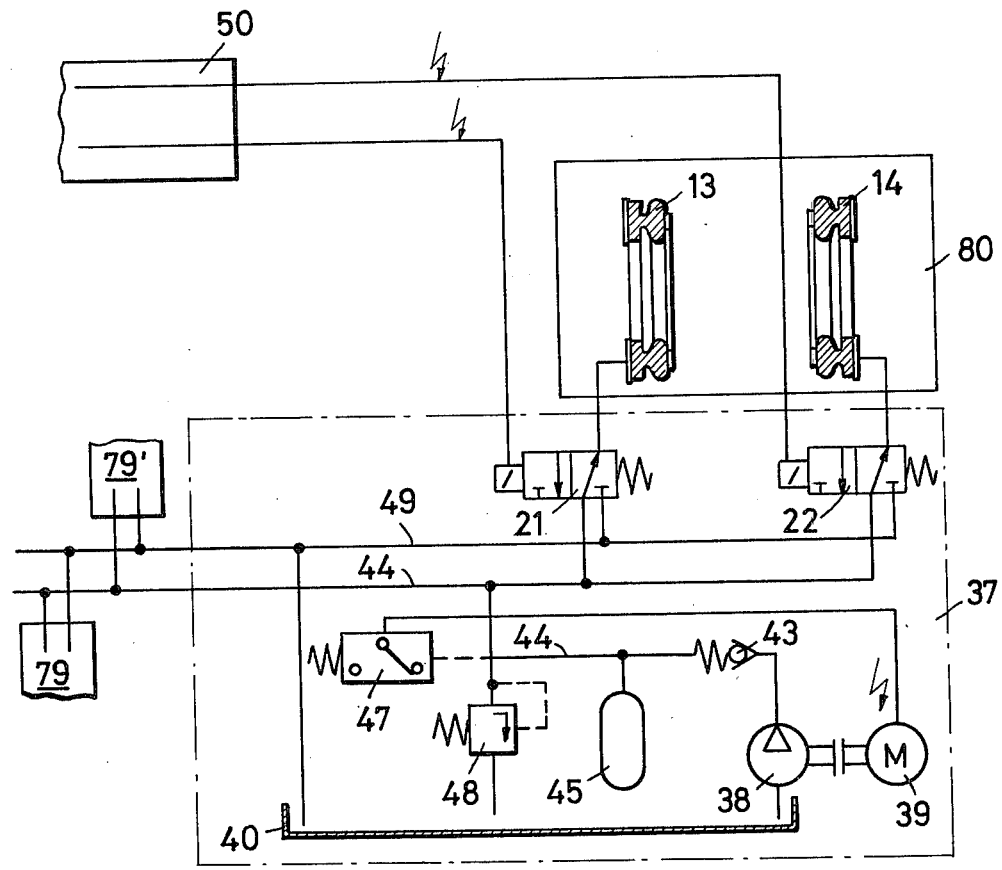
FIG. 5 is a switching diagram for stopping the device.

According to the switching diagram of the hydraulic block 37 shown in FIG. 5, the latter comprises a pump 38 driven by an electromotor 39. The pump 38 delivers the hydraulic oil from a sump 40 to a pressure line 44 by means fo a check valve 43. In the deenergized state in which they are represented, the electromagnetic control valves 21 and 22 free the connection to the brake cylinders 13 or 14.

As the oil being supplied is unable to flow away under these switching conditions, a pressure reservoir 45 is filled until an automatic pressure control switch 47 responds and switches off the motor 39. A pressure regulating valve 48 limits the pressure in the line 44 in the event that the automatic pressure control switch 47 fails to operate. If current is supplied to the control valves 21 and 22 the brake cylinders 13 and 14 are connected with a reflux line 49, thereby removing the braking action. If, after a plurality of braking operations, the overpressure drops to a specific lowest value, the motor 39 and thus the pump 38 will again be switched on by the automatic pressure control switch 47.

This process is independent of the control block 50. The capacity of the reservoir 45 is such that if the device is switched off or the electricity supply is cut off the brake cylinders and all the moving elements of the device are filled under adequate pressure and there is also a waste oil reserve.

The electrically operative follow-up motor 9 is also switched by the above-mentioned control block 50. The control system determines the direction of rotation and the differing control patterns of the control valves 21 and 22 by comparing the counting contents of the position $n_x$ which has been reached and of the next position $n_{x+1}$ to be encountered. This operation is shown in the program plan shown in FIG. 9.

If the distance between successive intermediate positions is smaller than or equal to the angle $a$ the brake cylinder 14 is not rendered pressureless by the engagement of a control valve 22 and the follow-up motor 9 switched on with the corresponding direction of rotation, until the stop plate 1 has reached the new position. After the follow-up motor 9 has been accelerated under the influence of a load its speed is controlled by the speed control part 4 as a function of the position of the stop 19 with respect to the respective contact surfaces 17 or 18. The stop 19 is moved at very low speed towards surface 17 or 18 depending on the direction of rotation and it is retained in that position in a force-locking manner by the follow-up motor 9. To eliminate any positioning inaccuracies caused by a recoiling action, the control valve 22 is not deenergized until a short period of time has elapsed owing to the provision of a time relay in the control system. When the valve 22 has been deenergized it is returned by a spring such that the brake cylinder 14 is connected with the pressure line 44 and is exposed to the influence of the medium under excess pressure. The excess pressure causes axial expansion of the brake cylinder 14. In the course thereof the friction lining 16 is placed against the positioning plate 8 and it presses the latter against the brake ring 24.

The positioning operation is now over and the follow-up motor is switched off.

If the distance between successive intermediate positions is greater than the angle $a$ the brake cylinders 13 and 14 are rendered pressureless through the simultaneous engagement of the control valves 21 and 22 and the servomotor 3 and the follow-up motor 9 are simultaneously engaged in the same direction.

After starting up the servomotor 3 operates at the programmed speed. After the acceleration period the speed of the follow-up motor 9 is synchronized with that of the servomotor 3 by the speed control part 4.

When approaching the nominal position the speed of the servomotor 3 is reduced so that it comes to a standstill upon reaching the same, thus determining the position of the stop plate 1 in the manner described. The speed of the follow-up motor 9 is time-controlled by the speed control part 4 in such a way that the stop plate 1 is already fixed in position before the stop 19 of the positioning plate 8 contacts the appropriate contact face 17 or 18 depending on the direction of rotation (see FIG. 6) The positioning is completed when the brake cylinder 14 has arrested the positioning member 2.

The auxiliary positioning gear of the displacement element consists of a stop rod 41 which is guided parallel to a positioning rod 42, a servomotor 3' and a speed control part 4'. A gear wheel 5' on the drive shaft of the servomotor 3' engages without play in a denticulated position 46 of the stop rod 41.

The follow-up positioning gear consists of the positioning rod 42 and a follow-up motor 9'. A gear wheel 10' on the drive shaft of the follow-up motor 9' engages in a denticulated portion 51 of the positioning rod 42.

The stop rod 41 and the positioning rod 42 are displaceably guided in the housing 12'. In this embodiment the positioning rod bears a tool as the positioning member 2. This tool consists of double gripper means 78b holding a workpiece 77b.

Brake pistons 53 and 54 are contained in a sealed manner in bores of the housing 12'. During braking they act on the stop rod 41 or the positioning rod 42 in a vertical direction in such a way that the latter are pressed against their guides in the housing 12'. The pistons 53 and 54 are provided on their front sides with friction linings 55 and 56. In the pressureless state an air gap is left between the friction lining 55 and the stop rod 41 or between the friction lining 56 and the positioning rod 42. These air gaps are produced by a pressure spring (not shown). The stop rod 41 encloses a stop 59 of the positioning rod 42 with the stops 60. When the positioning rod 42 is moved downwards (positive direction of movement) the stop 59 contacts a contact face 18'. When the rod 42 is moved in the opposite direction (negative direction of movement). The stop 59 contacts a contact face 17'. The speed control part 4' is connected both with the stop part of the positioning rod 42 and with the stop rod 41 and, in accordance with the direction of movement of the positioning rod 42 dependent upon the stretch b, it controls the speed of the follow-up motor 9' by means of a transmitter 36' in the manner shown in FIG. 6. The stretch b is formed by the position of the stop 59 with respect to the surface 18'.

Figure 6:
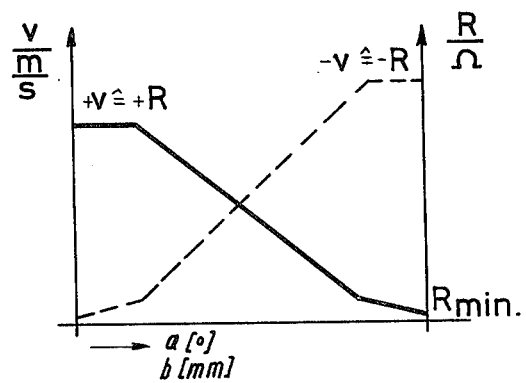
FIG. 6 is a diagram of the course of the speed of the positioning member as a function of the position of the stop and the direction of movement.

For each direction of movement + or —, the course of the speed can be adapted to suit the particular requirements, for example, by adopting a corresponding function as shown in FIG. 6 and by means of a suitable configuration of the resistance paths of a potentiometer.

Depending on the type of energy which is used to drive the follow-up motor 9' (electrical, pneumatic or hydraulic) and on the type of control system (analog or digital) the speed control part 4' — which may be used with or without successive amplification— can be in the form of an electrically operating potentiometer, a digital pulse generator with a control device connected in series therewith, or as a pneumatic or hydraulically operating volume regulating valve as described in connection with the rotating element.

Figure 3:
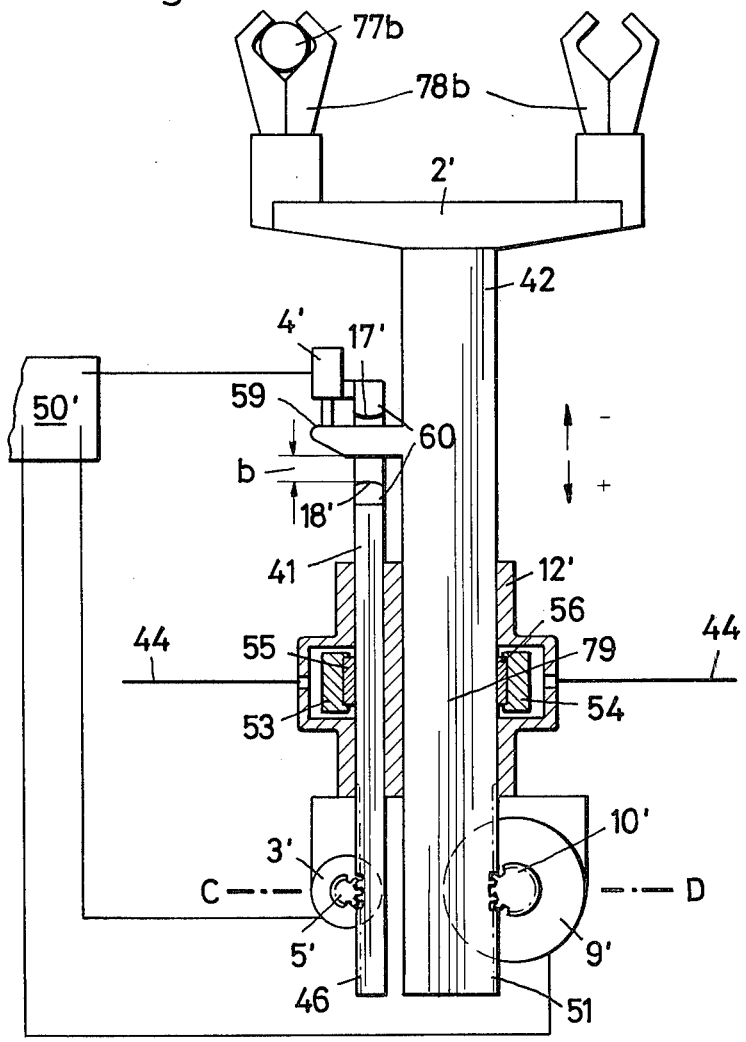
FIG. 3 is a side view of a displacement element.

In FIG. 3 the positioning rod 42 of the moving element is on the way from one intermediate position to the following one. The electrically operating sevomotor 3' which is represented by way of example, is switched on by the control device of the control block 50 through the intermediary of a transmitter 23' and operates according to a progammable speed and time mode. The control device determines the direction of rotation of the motor from the position and sequence of the intermediate positions. In this case, the actual values for regulating the speed and position of the servomotor 3' or the stop rod 41 are determined by means of an increment transmitter 23'. The control device determines the position from its pulse count and the speed from its pulse frequency and the servomotor 3' is regulated according to the programmed speed-time mode. As it approaches the nominal position the speed of the servomotor 3' is reduced until it comes to a standstill upon reaching the same.

Upon reaching this nominal position or in the case of disturbances a control valve 21' is deenergized and is returned by a spring such that the brake cylinder 23 is influenced by a medium under excess pressure, for example, from a hydraulic block as shown in FIG. 5. The excess pressure causes displacement of the brake piston 53. In the course thereof, the friction lining 55 is placed against the stop rod 41 and it presses the latter against the guide face of the housing. The excess pressure is selected so that the braking force is a multiple of the maximum force produced at the positioning rod 42.

The electrically operating follow-up motor 9' is also switched by the above-mentioned control device via the transmitter 36'. The control device determines its direction of rotation from the position and sequence of the intermediate positions.

If the distance between succeeding intermediate positions is smaller than or equal to the stretch b, the brake piston 54 is only rendered pressureless through the engagement of a control valve 22' when the stop rod 41 has reached the new position; the follow-up motor 9' then being switched on with the same direction of rotation. After acceleration under the influence of a load the speed of the motor 9' is controlled by the speed control part 4' as a function of the position of the stop 59 in relation to the respective stop face — as shown in FIG. 6. The stop 59 is moved towards the respective face 17' or 18' according to the direction of movement at a very low speed and is retained in that position in a force-locking manner by the follow-up motor 9'.

To eliminate any positioning inaccuracies caused by a possible recoiling action, the control valve 22' is not deenergized by a delay relay in the control block 50 until a short period of time has elapsed. It is then returned by a spring such that the brake piston 54 is acted on by the medium under excess pressure. The excess pressure causes displacement of the brake piston 54. In the course thereof, the friction lining 56 is placed against the positioning rod 42 and it presses the latter against the guide face of the housing 12'. The positioning operation is now completed and the follow-up motor 9' is switched off.

If the distance between successive intermediate positions is greater than the distance b the brake pistons 53 and 54 are rendered pressureless through the simultaneous connection of the control valves 21' and 22' and the servomotor 3' and the follow-up motor 9 are simultaneously engaged in the same direction.

After starting up, the servomotor 3' operates at the programmed speed. After the acceleration period the speed of the follow-up motor 9' is synchronized with that of the servomotor 3' by the speed control part 4'. When approaching the nominal position the speed of the servomotor 3' is reduced so that it comes to a standstill upon reaching the same and the stop rod 41 is arrested in the manner described.

The timing of the speed controlling action exerted by the speed control part 4' on the follow-up motor 9' is such that the stop rod 41 is already fixed in position before the stop 59 of the positioning rod 42 contacts the appropriate contact face 17' or 18' depending on the direction of movement. The positioning operation is completed when the positioning rod 42 is fixed in position.

FIG. 7 shows how the moving elements of a handling device consisting of a element 80 and two displacement elements 79 and 79' are mutually connected both mechanically and energywise.

In this case the rotating element is mounted on the shed floor of a manufacturing plant and it bears the displacement element 79 which in turn supports the displacement element 79', with the result that the space about the device can be covered according to cylinder coordinates. The moving parts are assembled in such a way that the first displacement element 79 forms the positioning member of the element 80 and the second displacement element 79' forms the positioning member of the first displacement element 79. The second displacement element 79' bears a tool consisting of a gripper means 78 holding a workpiece 77. Connecting lines 81 lead from the control block 50 to the element 80 and from the latter to the displacement elements 79 and 79'. Pressure lines 44 lead to the moving elements from the hydraulic block 37 mounted on the rotating element 80 and discharge lines 49 lead back.

Figure 9:
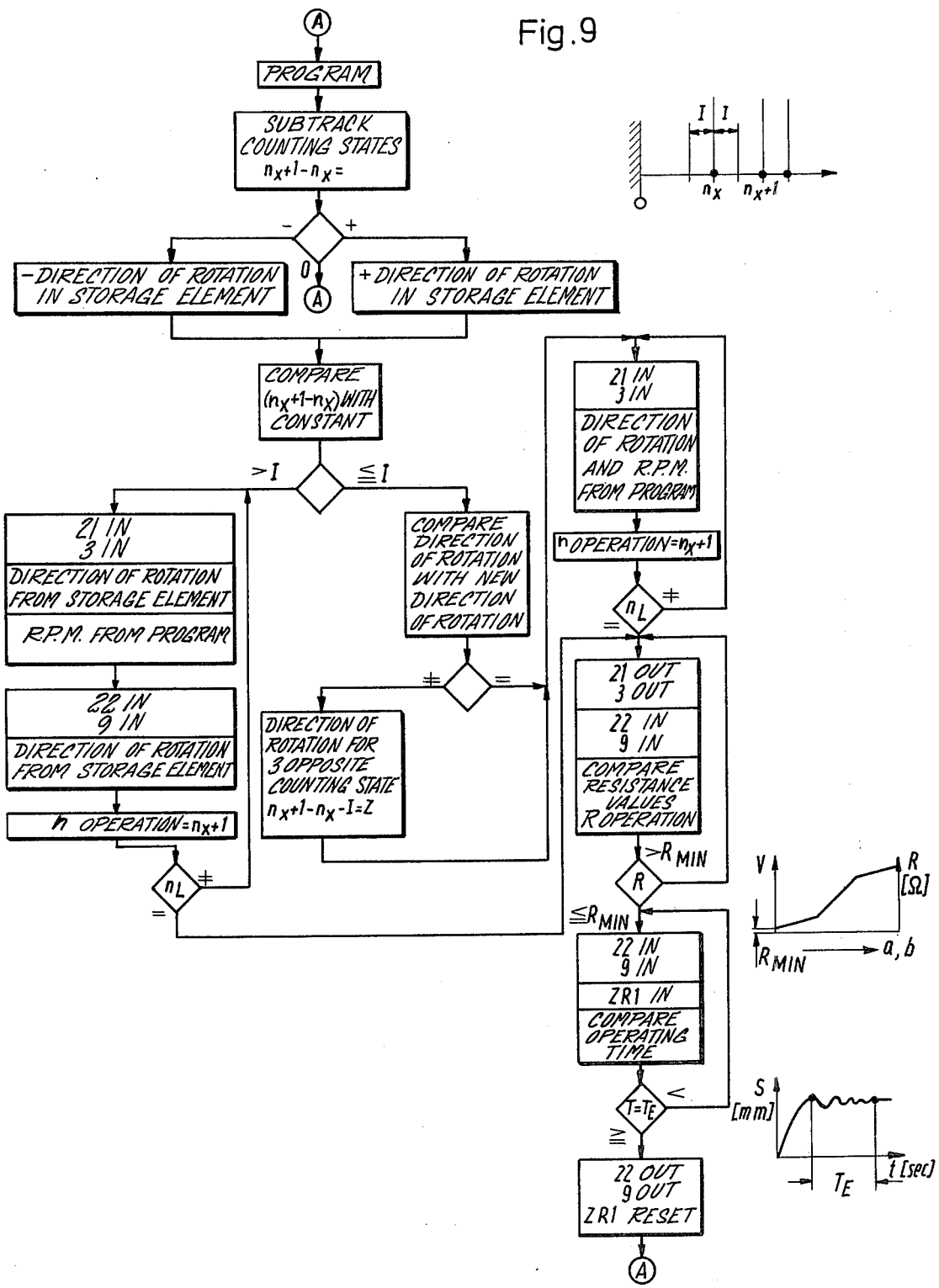
FIG. 9 shows a plan of the control program for controlling the position of a moving element.

FIG. 9 represents an exemplary programming plan for positioning a rotating element. It is shown how the control system determines the direction of rotation of the positioning motors 3 and 9 and the varying controlling action exerted on the control valves 21 and 22 for the brakes by comparing the counting contents of the position $n_x$ which has been reached with the position indicated in the storage element as the next position $n_{x+1}$ to be approached.

After a master control program in the control block 50 of the moving element has produced the order to proceed to the following nominal position $n_{x117\ 1}$, the meter indication of the existing position $n_x$ is subtracted from the nominal value $n_{x+1}$, the sign is determined and the result compared with the constant I. I represents the number of increments corresponding to the maximum distance $a_{max}$; R represents the resistance 27 or 67 which is decisive in controlling the speed according to FIG. 6 and ZR 1 represents the delaying relay bridging the recoil period. The orders resulting from the operating plan are issued by the control block 50 according to FIG. 8 and a signal indicating that the nominal position has been reached is conveyed back to the master control program.

Research into the operational possibilities of devices according to the invention have shown that in the case of many applications a limited number of at minimum six and at maximum twelve possible positions for each moving element are sufficient.

Figures 12, 13:
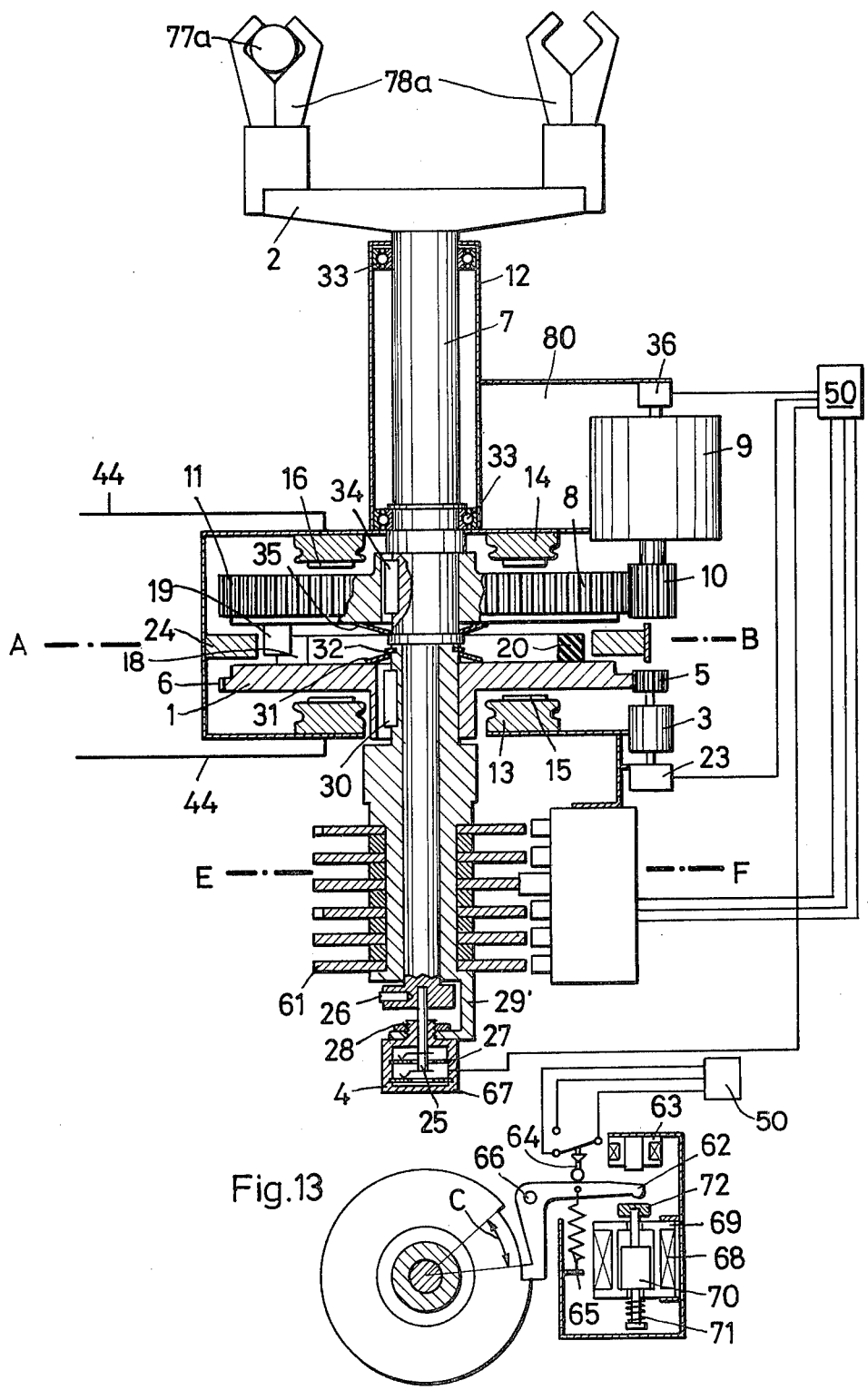
FIG. 12 shows a rotating element as shown in FIG. 1 and a device for mechanically positioning the auxiliary positioning gear.
FIG. 13 is a section along the line E - F.

FIGS. 12 and 13 show a corresponding embodiment of the invention in the case of the rotating element according to FIG. 1.

Figure 14:
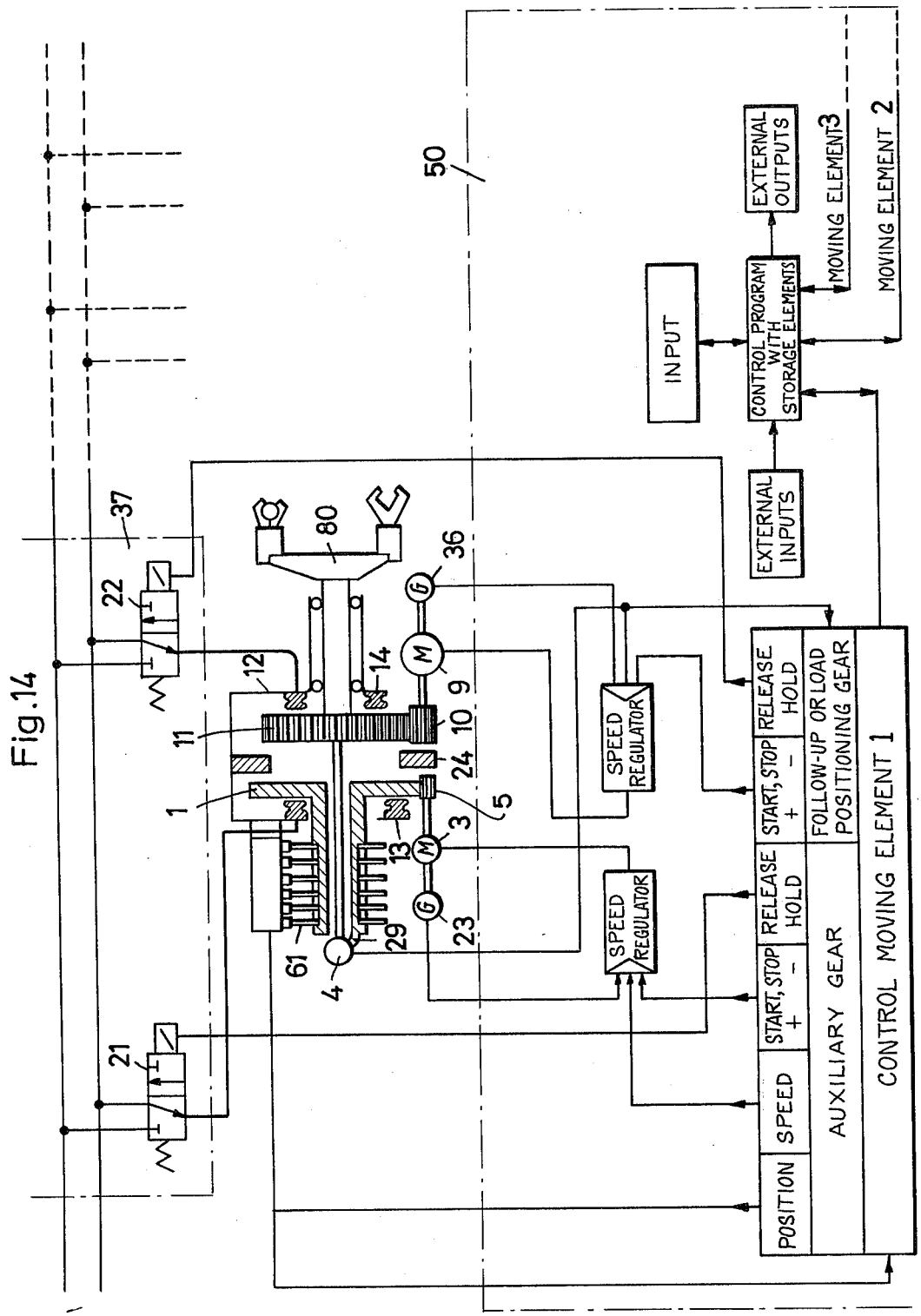
FIG. 14 is a block diagram for the operation of a moving element with a mechanically positioned auxiliary positioning gear.

Comparison of the block switching diagrams according to FIGS. 14 and 18 will show that a less complicated control system is made possible by limiting the possibilities of positioning the auxiliary positioning gear in this manner.

The rotating element shown in FIG. 12 corresponds to the rotating element according to FIG. 1 with the exception of a hub 29' on which a plurality of cam disks 61 are displaceably secured. Linear cam means could also be provided on the displacement element shown in FIG. 3.

Each cam plate 61 is provided with a locking lever 62, a holding magnet 63, a limit switch 64 and a tension spring 65 which are attached to the housing 12 in a switch box. The locking levers 62 are rotatable on an axis 66 which is rigidly connected to the switch box on the housing 12. An electric lifting magnet 68 is also rigidly connected by its coil form 69 to the housing 12 through the intermediary of the switch box. An armature 70 of the electric lifting magnet 68 is moved into the position indicated in the deenergized state by a biased pressure spring 71. A band 72 which is connected to the armature 70 extends over all the levers 62. A guide (not shown) prevents the band 72 from being rotated about the axis of rotation of the armature 70.

Figure 15:
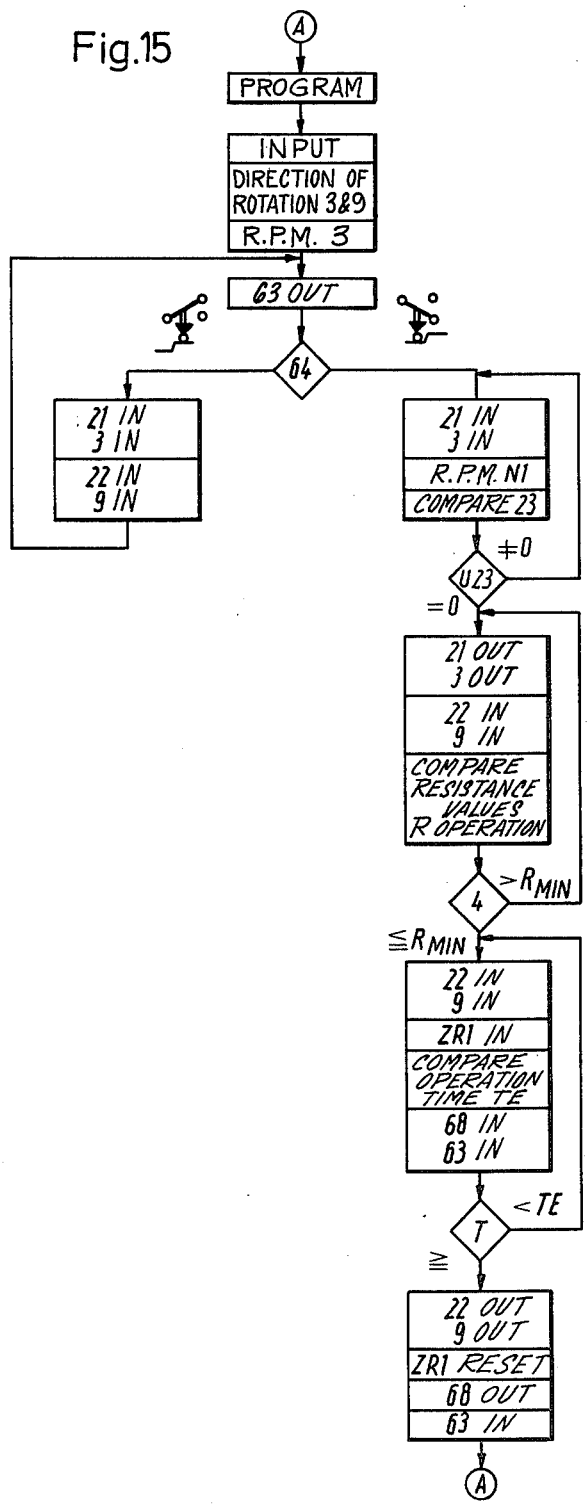
FIG. 15 shows a programming plan of the positioning procedure with a moving element as shown in FIG. 12.

The positioning operation for a moving element as shown in FIG. 12 proceeds according to the programming plan shown in FIG. 15.

The master control program starts the positioning operation for a specific position or cam plate 61 by influencing the limit switch 64 associated therewith and by disconnecting its respective holding magnet 63. The direction of rotation of the motors 3 and 9 and the maximum r.p.m. for the motor 9 are preset.

After the holding magnet 63 has been disconnected, the locking lever 62 is moved against the cam plate 61 by the action of the tension spring 5. If, in the course thereof, the locking lever 62 strikes with its abutment nose against the outer periphery of the cam plate 61, the limit switch 64 will remain in the position indicated. This position of the limit switch 64 produces in the control block the simultaneous connection of the valves 21 and 22 and also of the motors 3 and 9. The follow-up motor 9 is coupled in terms of speed with the servomotor 3 through the above-described speed control part 4.

During rotation of the cam plate the periphery of its recess contacts the locking lever 62. Under the action of the tension spring 65 the locking lever 62 moves to the base of the recess and in the course thereof switches the limit switch 64. The switching of the limit switch 64 produces a reduction in the r.p.m. of the motor 3. After being rotated through the angle c the cam plate 61 reaches the abutment nose of the locking lever 62 with its contact edge and remains stationary. The stoppage of the cam plate is signalled to the control block 50 through the absence of voltage in the tachogenerator 23. It causes the control valve 21 and the motor 3 to be disconnected and also causes the stop plate 1 to be arrested via the brake cylinder 13.

After the auxiliary positioning gear has been moved into the preselected position, the positioning member 2 is moved thereafter in the manner described.

If the distance between the existing position and the following one is equal to or smaller than the angle c, which in turn is equal to or smaller than a or b, the locking lever 62 will reach the base of the recess of the cam plate 61 immediately after the holding magnet 63 is switched off and will then switch the limit switch 64. This switching of the limit switch 64 influences the positioning process to be effected in that only the brake cylinder 13 is supplied with air and the motor 3 is engaged at a low r.p.m.

The stoppage of the cam plate when its contact edge strikes against the abutment nose of the locking lever 62 is signalled to the control block through the absence of electrical tension of the tachogenerator 23 and it produces disconnection of the valve 21 and the motor 3 and engagement of the valve 22 and motor 9, thereby causing the positioning member 2 to be moved towards the arrested positioning plate 1.

Simultaneously with the engagement of the timing member for bridging the recoil period when the stop 19 strikes the contact face 17 or 18, the holding magnet 63 and the electric lifting magnet 68 are also connected in. The electric lifting magnet 68 moves the locking lever 62 which consists of magnetizable material against the armature of the engaged holding magnet 63, the holding force of which is greater than the pressure of the limit switch and the tension of the tension spring 65. After the delay provided by the timing member has elapsed the electric lifting magnet 68 is disconnected and is returned to the position indicated under the action of the pressure spring 71.

What is claimed is:

1. A programmable device for mechanically executing work processes, more particularly, a handling device having moving elements consisting of a series of mutually coupled rotating or displacement elements, wherein the moving element situated at the one end is associated with a production unit while the moving element situated at the other end has a tool mounted thereon, characterized in that the moving elements (79, 79', 80) consist of load-independent programmable auxiliary positioning gears (3, 5, 6, 1, 20; 3', 5', 46, 41, 60) and of load-dependent follow-up positioning gears (10, 11, 8, 19, 2; 10', 51, 42,59, 2'), wherein the programmable auxiliary positioning gear has stops (20; 60) for a positioning member (2; 2'); said load-dependent follow-up positioning gears having a contact member (19, 59) cooperating with said stops to position said positioning member, and a follow-up drive (9; 9') for driving said follow-up gears at a velocity controlled by the distance between said stops and said contact member without loading said auxiliary positioning gear, said stops being connectable in a force-locking manner with a stationary housing part (12; 12') and said positioning member (2; 2') being moved to a position determined by the stops (20; 60) of the auxiliary positioning gear by the follow-up gear in synchronism therewith through the intermediary of a speed control means (4; 4').

2. A device as claimed in claim 1, characterized in that the positioning member (2;2') of the moving elements (79,79',80) is connected in a form-locking manner with a tool (78) or another moving element.

3. A device as claimed in claim 1, characterized in that the load-independent auxiliary positioning gear comprises an element (1;41) bearing the stops (20;60) which is displaceable by a drive means (6, 5, 3; 46,5', 3') and controllable via an incremental pulse generator (23;23') connected both to a servomotor (3;3') of the drive means and to a programmable control block (50).

4. A device as claimed in claim 1, characterized in that the load-dependent follow-up gear comprises an element (6, 8; 42) which is connected in a form-locking manner, on the one hand, to the positioning member (2; 2') and, on the other hand, to said contact member (19; 59).

5. A device as claimed in claim 3 characterized in that the contact member (19;59) which is connected to the follow-up positioning gear (8;42) engages in an angular space or passage space (a; b) between the stops (20;60) of the auxiliary positioning gear, the contact surfaces (17, 18;17'18') defining the space ensuring that the coordination of the paths of the auxiliary positioning gear and the follow-up gear is maintained.

6. A device as claimed in claim 1, characterized in that the speed control means (4;4') is in the form of an adjustable resistance with a resistance path (27,67) for each direction of movement; of the parts of the resistance which are adjustable with respect to one another, one part being connected to the auxiliary positioning gear and the other part to the follow-up positioning gear.

7. A device as claimed in claim 6, characterized in that the course of the resistance value (26, 27) controlling the course of the speed of the follow-up motor (9; 9') over an angle or path (a; b) is determinable according to a preselected function independent of the direction of movement and is planned in such a way that the follow-up speed approaches zero upon the contact member (19; 59) drawing closer to the stops (20; 60).

8. A device as claimed in claim 1, characterized in that the speed control means (4; 4') is in the form of volume regulating valves (82,83) for a fluid or gaseous operating medium for each direction of movement; the parts of the valve which are displaceable with respect to one another and which carry out the controlling operation being connected either to the auxiliary positioning gear (29;1) or to the follow-up positioning gear (7,2).

9. A device as claimed in claim 8, characterized in that the flow passage cross-section of the valves controlling the course of the speed of the follow-up positioning gear is designed according to a preselected function in such a way tht the follow-up speed is reduced towards zero as the contact member draws closer to one of the stops.

10. A device as claimed in claim 1, characterized in that the speed control means (4; 4') is in the form of a digital pulse generator having coding element (84) and sensing head (85) which are respectively connected to one or the other of the auxiliary positioning gear (29) and the follow-up positioning gear (7).

11. A device as claimed in claim 1, characterized in that hydraulically operable brake elements (13, 14; 53, 54) are rigidly connected to the housing (12; 12'); by means of which brake elements the auxiliary positioning gear and the follow-up positioning gear can be connected to the housing in a force-locking manner.

12. A device as claimed in claim 11, characterized in that control valves (21, 22;21',22') returnable by springs are disposed in such a way that in the deenergized state they free the path for a pressure medium for operating the brake elements (13, 14; 53,54).

13. A device as claimed in claim 5, characterized in that the rotating element associated with the production unit comprises a rotatable shaft (7) which is fixed in an axial direction and on which is mounted in an axially displaceable manner a positioning member (8) which is non-rotatably connected therewith by means of an adjusting spring (34) and which bears the contact member (19) for the positioning member (2); said rotatable shaft (7) being excitable by means of a denticulated portion (11) which is attached thereto and a driving pinion (10) of a follow-up motor (9) engaging in the denticulated portion and said shaft (7) having rotatably mounted thereon a hub-type bushing (29) with which a plate (1) bearing the stops (20) is connected in an axially displaceable but non-rotatable manner by way of another adjusting spring (30); said plate (1) being excitable by way of a denticulated portion (6) mounted thereon and a driving pinion (5) of the servomotor (3) engaging in said denticulated portion.

14. A device as claimed in claim 13, characterized in that the stationary housing port comprises a brake ring (24) which is disposed coaxially to the shaft (7) between the stop plate (1) and the positioning plate (8) and which is rigidly connected to the housing port (12).

15. A device as claimed in claim 14, characterized in the hydraulically operable brake cylinders (13,14) are rigidly connected to the housing port (12) and are disposed opposite one another coaxial to the shaft (7) in such a way that during braking they are able to press the axially displaceable stop plate (1) or the axially displaceable positioning plate (8) against oppositely disposed sides of the brake ring (24); there being provided for pressing back the plates (1,8) after braking, a first cup spring (31) which is arranged with initial biasing between a retaining ring (32) mounted on the hub (29) and the stop plate (1) and a second cup spring (35) which is arranged with initial biasing between a flange of the shaft (7) and the positioning plate (8).

16. A device as claimed in claim 13, characterized in that one of the parts activating the speed control means (4) by mutual displacement is rigidly connected with the hub (29) and the other part with the shaft (7).

17. A device as claimed in claim 5, characterized in that the displacement element (79, 79') in parallel guides of the housing part (12') comprises a longitudinally displaceable rod (41) bearing the stops (60) and a longitudinally displaceable positioning rod (42) bearing the contact member (59) engaging in the stops (60) and also the positioning member (2'); said stop rod (41) being displaceable by way of a denticulated portion (46) mounted thereon and a driving pinion (5') of the servomotor (3') engaging in the denticulated portion and said positioning rod (42) being displaceable by way of a denticulated portion (51) mounted thereon and a driving pinion (10') of the follow-up motor (9') engaging in said denticulated portion.

18. A device as claimed in claim 17, characterized in that hydraulically operated brake pistons (53,54) provided in cylindrical recesses of the housing (12') are disposed in such a way that when the brakes are activated the rods (41,42) are pressed against the respective guides in the housing (12').

19. A device as claimed in claim 13, characterized in that a hydraulic block (37) is provided on the base support of the moving element (80) connected to the production equipment for the operation of all the brakes (21, 13, 22, 14; 21', 53, 22', 54) of all the moving elements (79, 79', 80); said hydraulic block (37) comprising a pump (38) driven by a motor (39) and supplying a medium (oil) from a sump (40), to a check valve (43), a pressure regulating valve (48), an automatic pressure control switch (47) for the motor (39) and a pressure reservoir (45) by the pressure line (44), the capacity of the reservoir is such that when the energy supply is cut off the brake cylinders of all the moving elements (79, 79', 80) are under adequate pressure.

20. A device is claimed in claim 5, characterized in that the program control systems with storage elements for all the moving elements are combined in one control block (50); an individual control unit which controls the auxiliary positioning gear and the follow-up gear being provided for each moving element and its storage element providing all moving elements with connection to the control block through external inputs and outputs.

21. A device as claimed in claim 13, characterized in that pre-adjustable cam plates (61) for mechanically positioning the auxiliary positioning gear are provided on the hub (29') and controllable locking levers (62) which are associated therewith are provided on the housing (12).

22. A device as claimed in claim 21, characterized in that a limit switch (64) which influences the control course by the position of the locking lever is provided for each locking lever (62).

23. A device as claimed in claim 21, characterized in that a holding magnet (63) is associated with each locking lever (62) and also a device (68) which takes charge of returning a dropped locking lever to the holding magnets.

24. In a device for fast moving and exactly positioning a load-dependent positioning member on a predetermined path according to an auxiliary positioning member, the device having a support a load-independent auxiliary positioning drive for the auxiliary positioning member and a load-dependent follow-up drive for the load-dependent positioning member, the velocity of the follow-up drive being controlled dependent on the distance of the load-dependent positioning member from the auxiliary positioning member and decreasing to zero on reaching the latter, the combination wherein the load-dependent positioning member and the auxiliary positioning member have coacting abutments, the abutment of the auxiliary positioning member being lockable with respect to the support, the abutment of the load-dependent positioning member being fixable in contact with the abutment of the auxiliary positioning member by the force of the follow-up drive, the load-dependent positioning member being positionable thereby at the abutment of the auxiliary positioning member under the force of the follow-up drive without loading the auxiliary positioning drive.

25. The device of claim 24 wherein abutment has two oppositely directed abutment faces each, the abutment faces of one abutment facing to each other and including the other abutment, the abutment faces of the other abutment, the abutment faces of the other abutment being turned away from one another and facing to the abutment faces of the one abutment, the auxiliary positioning drive being arranged such that the auxiliary positioning member is fixable with that abutment face in the desired position which faces contrarily to the follow-up direction.

26. The device of claim 25 wherein the follow-up speed is continuously variable dependent on the distance (a) of the abutment faces approaching one another.

27. The device of claim 24 wherein also the load-dependent positioning member is provided with means for being locked with respect to the support, such means being arranged to operate with delay after the time of the first contact of the abutments.

28. The device of claim 27 wherein the follow-up drive comprises a fluid driven motor, the speed of which is variable by means of volume regulating valves.

29. The device of claim 27 wherein the means for locking at least one of the auxiliary positioning member and the loaddependent positioning member include brakes arranged at the support.

30. The device of claim 29 wherein the brakes are arranged to be in braking position in the de-energized state of the device.

31. The device of claim 29 wherein control valves returnable by springs are disposed in such a way that in the de-energized state they free the path for a pressure medium from a pressure reservoir for operating the brakes.

32. The device of claim 29 wherein for rotating movements there is provided a rotatable shaft which is fixed in an axial direction and on which is mounted in an axially displaceable manner a positioning disc (8) which is non-rotatably connected therewith and which bears the abutment (stop 19) for the load-dependent positioning member; said rotatable shaft being rotatably driveable by means of a follow-up motor, said shaft having rotatably mounted thereon a hub-type bushing (29) with which a disc (1) bearing the abutments (20) is connected in an axially displaceable but non-rotatable manner; said disc (1) being rotatably driveable by a servo-motor (3).

33. The device of claim 32 wherein the support includes a brake ring (24) which is disposed coaxially to the shaft (7) between the disc (1) and the positioning disc (8) and which is rigidly connected to the housing (12).

34. The device of claim 32 wherein means for measuring the distance between the corresponding abutment faces which means is connected to the shaft (7) on one hand and with the bushing (29) on the other hand.

35. The device of claim 29 wherein for linear movements there is provided a displacement element (79, 79') comprising in parallel guides of a housing (12'), a longitudinally displaceable auxiliary rod (41) bearing the stop (pair of stops 60) and a longitudinally displaceable load-rod (42) bearing the stop (59) engaging the stop (60), and also the load-dependent positioning member (2'); said auxiliary rod (41) being displaceable by a servomotor (3') and the load-rod being displaceable by a follow-up motor (9').

36. The device of claim 30 wherein a hydraulic block (37) is provided on the base support and is connected to the production equipment for the operation of all the brakes (21, 13, 22, 14; 21', 53, 22', 54) of all the moving elements (79, 79', 80); said hydraulic block (37) comprising a pump (38) driven by a motor (39) and supplying a medium (oil) from a sump (40) to a check valve (43), a pressure regulating valve (48), an automatic pressure control switch (47) for the motor (39) and a pressure reservoir (45) through pressure line (44), the capacity of the reservoir is such that when the energy supply is cut off the brake cylinders of all the moving elements (79, 79', 80) are under adequate pressure.

37. The device of claim 25 wherein a plurality of such devices is arranged in series with different direction of the predetermined paths.

* * * * *

UNITED STATES PATENT AND TRADEMARK OFFICE
CERTIFICATE OF CORRECTION

PATENT NO. : 4,015,721
DATED : April 5, 1977
INVENTOR(S) : Holger Scheler

It is certified that error appears in the above-identified patent and that said Letters Patent are hereby corrected as shown below:

Column 1, line 54, "spots" should be --stops--.

Column 2, line 29, "therfore" should be --therefore--; Line 59, "oerating" should be --operating--.

Column 5, line 67, "fo" should be --of--.

Column 7, line 10, "positioning is" should be --positioning operation is--; line 26, "member 2" should be --member 2'--; line 44, "The" should be --the--.

Column 8, line 3, "sevomotor" should be --servomotor--; line 7, "progammable" should be --programmable--; line 22, "23" should be --53--.

Column 9, line 51, "$n_{x117\ 1}$" should be --$n_{x+1}$--.

Column 10, line 5, "FIGS 14 and 18" should be --FIGS 14 and 8--.

Column 14, lines 57 and 58, "the abutment faces of the other abutment" should be canceled.

Signed and Sealed this

Fourteenth Day of February 1978

[SEAL]

Attest:

RUTH C. MASON
Attesting Officer

LUTRELLE F. PARKER
Acting Commissioner of Patents and Trademarks